(12) United States Patent
Iihoshi et al.

(10) Patent No.: US 6,865,880 B2
(45) Date of Patent: Mar. 15, 2005

(54) EMISSION CONTROL DEVICE FOR CYLINDER FUEL INJECTION ENGINE

(75) Inventors: Yoichi Iihoshi, Tsuchiura (JP); Minoru Ohsuga, Hitachinaka (JP); Toshiharu Nogi, Hitachinaka (JP); Takuya Shiraishi, Hitachinaka (JP); Noboru Tokuyasu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/066,760

(22) Filed: Feb. 6, 2002

(65) Prior Publication Data

US 2002/0083702 A1 Jul. 4, 2002

Related U.S. Application Data

(62) Division of application No. 09/793,402, filed on Feb. 27, 2001.

(30) Foreign Application Priority Data

Mar. 31, 2000 (JP) ........................................ 2000-101178

(51) Int. Cl.[7] .............................................. F01N 3/00
(52) U.S. Cl. ............................ 60/285; 60/284; 60/300; 123/299
(58) Field of Search ........................ 60/274, 284, 285, 60/286, 300, 301; 123/295, 299

(56) References Cited

U.S. PATENT DOCUMENTS 5,655,365 A * 8/1997 Worth et al. ................... 60/285
5,826,425 A * 10/1998 Rossi Sebastiano et al. ... 60/274
5,826,427 A * 10/1998 Yanagihara et al. .......... 60/276
5,839,275 A * 11/1998 Hirota et al. .................. 60/285
5,845,492 A * 12/1998 Isobe et al. .................... 60/284
5,956,942 A * 9/1999 Sebastiano et al. ........... 60/284
5,967,113 A * 10/1999 Kaneko et al. ............. 123/295
5,974,788 A * 11/1999 Hepburn et al. ............... 60/285
5,996,338 A * 12/1999 Hirota et al. .................. 60/285
6,041,591 A * 3/2000 Kaneko et al. ................ 60/284
6,058,700 A * 5/2000 Yamashita et al. ............ 60/285
6,134,884 A * 10/2000 Morinaga ..................... 60/284
6,141,960 A * 11/2000 Takami et al. ................ 60/286
6,178,743 B1 * 1/2001 Hirota et al. .................. 60/286
6,195,987 B1 * 3/2001 Miyashita ..................... 60/285
6,199,374 B1 * 3/2001 Hirota et al. .................. 60/285
6,216,450 B1 * 4/2001 Takahashi et al. ............ 60/274
6,378,297 B1 * 4/2002 Ito et al. ....................... 60/286
6,536,209 B2 * 3/2003 Fluga et al. ................... 60/284

FOREIGN PATENT DOCUMENTS

JP    A 11-294220    10/1999
JP    A 11-311139    11/1999

\* cited by examiner

Primary Examiner—Tu M. Nguyen
(74) Attorney, Agent, or Firm—Crowell & Moring LLP

(57) ABSTRACT

An exhaust control system for a cylinder fuel injection engine having a cylinder injection injectors directly injecting a fuel into combustion chambers and a catalytic converter provided in an exhaust passage from said combustion chambers for purifying an exhaust gas, such that the air/fuel ratio in the combustion chambers is periodically made richer for quickening activation of catalytic converter.

3 Claims, 24 Drawing Sheets

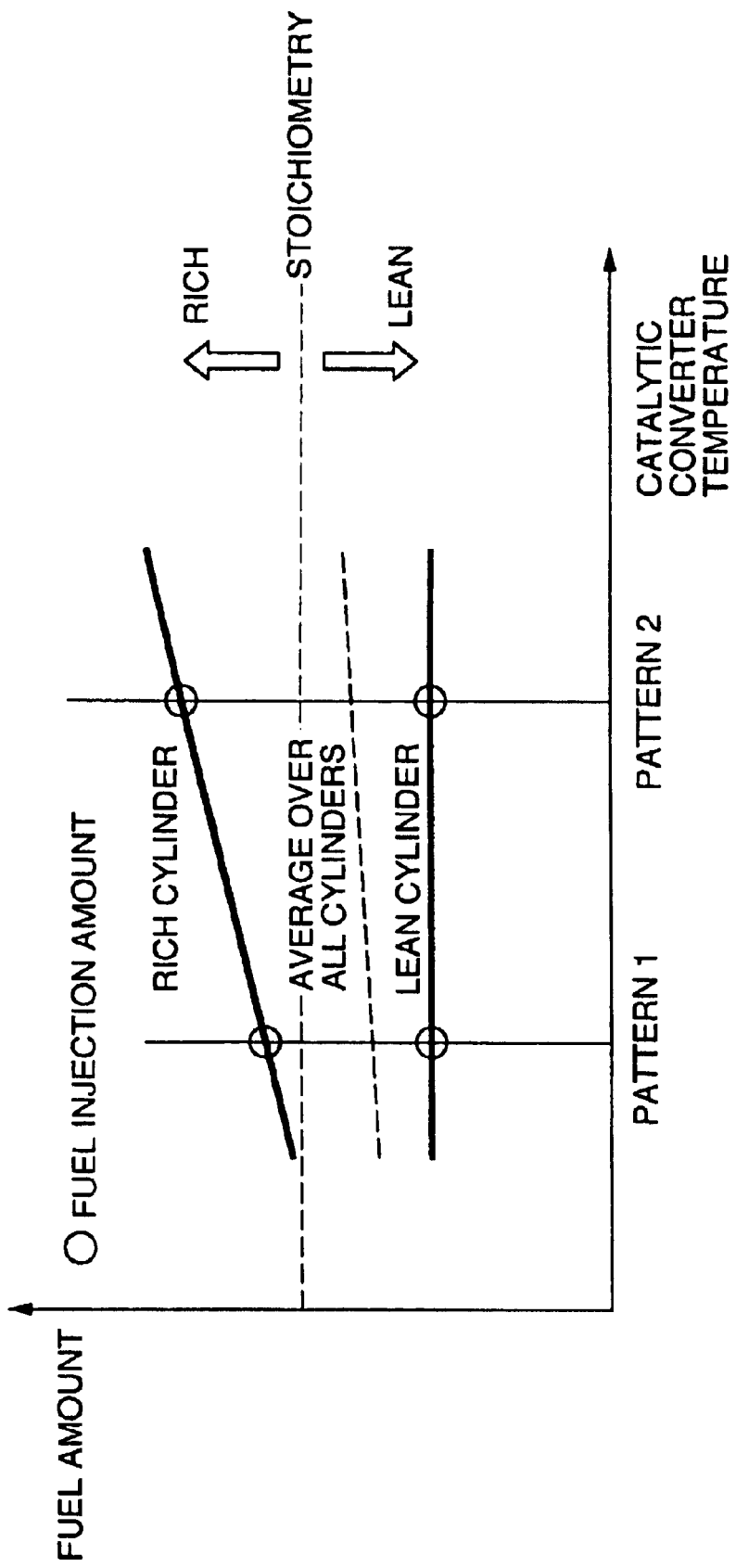

PATTERN 1

PATTERN 2

PATTERN 3

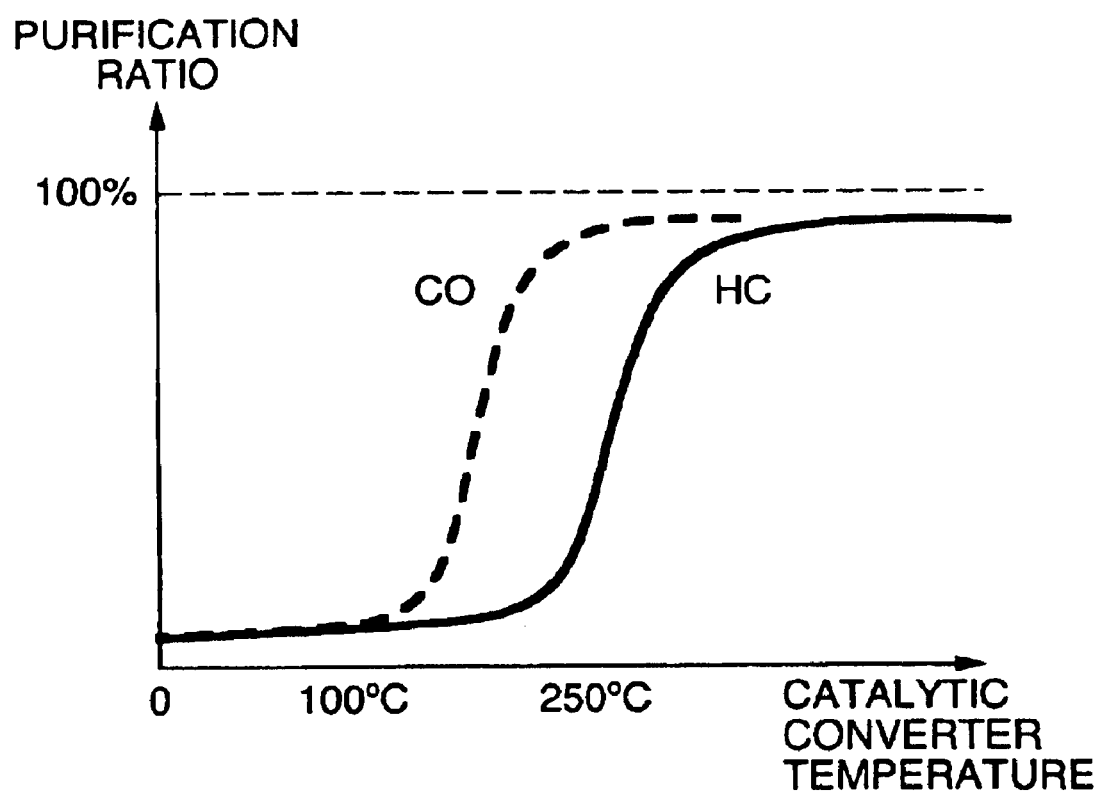

WHEN CATALYST TEMPERATURE IS LOWER THAN PREDETERMINED VALUE

WHEN CATALYST TEMPERATURE IS HIGHER THAN PREDETERMINED VALUE

AT LOW TEMPERATURE

AT HIGH TEMPERATURE

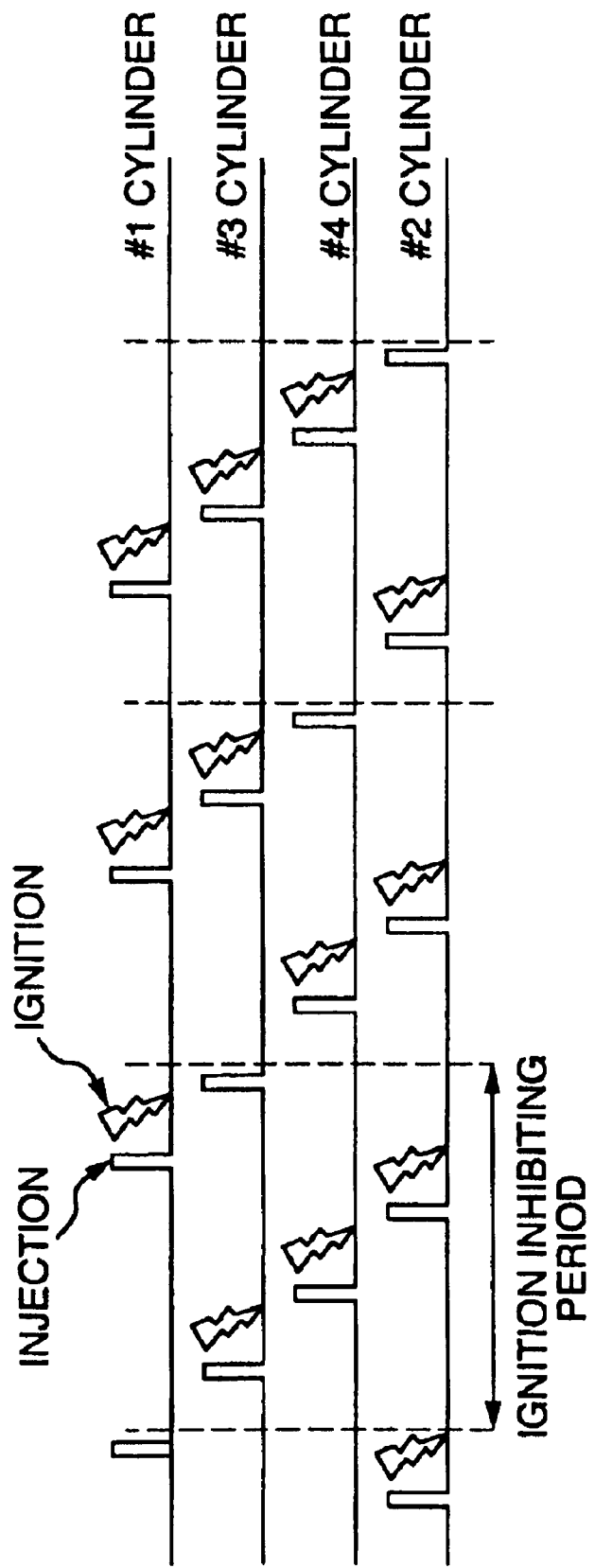

EMISSION CONTROL DEVICE FOR CYLINDER FUEL INJECTION ENGINE

This application is a divisional of application Ser. No. 09/793,402, filed Feb. 27, 2001.

CROSS-REFERENCE TO RELATED APPLICATIONS

The present application relates to subject matters described in application which will be filed around Feb. 28, 2001 by T. Shiraishi, T. Nogi, N. Tokuyasu, Y. Iiboshi and M. Oosuga and entitled "METHOD OF STARTING A CYLINDER INJECTION ENGINE" and assigned to the assignee of the present application. The disclosure of the above application is herein incorporated by reference.

BACKGROUND OF THE INVENTION

1. Field of the Invention

The present invention relates to an exhaust control system for a cylinder fuel injection engine. More particularly, the invention relates to an exhaust control system realizing early activation of a catalytic converter.

2. Description of the Related Art

In general, an exhaust gas of an engine is purified by a catalytic converter. When the catalytic converter is not activated, such as upon starting up of the engine, the exhaust gas is discharged to the atmosphere with little purification. Therefore, in Japanese Patent Application Laid-Open No. 11-294220, as a method for preventing fatigue and decomposition of catalytic converter, quickening purification of exhaust gas, appropriately heating the catalytic converter and prevention of discharge of unburnt gas, it has been disclosed a fuel injection control system in a cylinder direct injection type internal combustion engine directly injecting a fuel by fuel injection valve which includes engine start-up detecting means for detecting start-up of the internal combustion engine, temperature detecting means for detecting a temperature of the internal combustion engine, cold engine condition detecting means for comparing a detection value obtained by the temperature detecting means and a preliminarily stored predetermined value for detecting a low temperature condition of the engine from the result of comparison, and control means for limiting fuel injection in an expansion stroke or an exhaust stroke only during a predetermined period (predetermined engine revolution cycles) from initiation of injection when starting up of the internal combustion engine is detected and cold engine condition is detected by the cold engine condition detection means. On the other hand, in Japanese Patent Application Laid-Open No. 11-311139, as a method for realizing quick activation of catalytic converter by interrupting fuel supply for a part of cylinders upon starting-up of a multiple cylinder engine, it has been disclosed an air/fuel ratio control system for a multi-cylinder internal combustion engine which includes a catalytic converter for purification of exhaust gas arranged in an exhaust passage of the internal combustion engine having a plurality of cylinders, air/fuel ratio control means for starting up for controlling air/fuel ratio for rich mixture operation in part of cylinders among a plurality of cylinders and lean mixture operation in remaining cylinders upon cold start of the internal combustion engine, wherein catalytic converter temperature detecting means for detecting a temperature of the catalytic converter for setting air/fuel ratio until the catalytic converter temperature detected by the catalytic converter temperature detecting means reaches a predetermined temperature to be richer than that set after reaching the predetermined temperature, up cold start of the internal combustion engine.

However, since the invention disclosed in the above-identified Japanese Patent Application Laid-Open No. 11-294220 performs second injection immediately after starting up of the engine where temperatures of peripheral wall of the cylinder and a piston are low (after stopping a starter motor), fuel of the second injection injected toward the peripheral wall of the cylinder cannot be atomized sufficiently to degrade combustion to results in discharge of large amount of HC and CO. On the other hand, a technology disclosed in the above-identified Japanese Patent Application Laid-Open No. 11-311139 does not disclose a method of exhaust gas purification before the temperature of the catalytic converter does not reach a temperature of 200° C., at which HC is oxidized. When the catalytic converter is arranged below a floor panel, it takes a long period for rising the catalytic temperature to results in discharging of large amount of HC and CO to the atmosphere.

SUMMARY OF THE INVENTION

The present invention has been worked out for solving the problems set forth above. It is therefore an object of the present invention to quicken activation of catalytic converter by controlling an exhaust gas energy (exhaust temperature) and a combustible component of the exhaust gas (HC, CO or the like).

In order to accomplish the above-mentioned and other object, according to one aspect of the present invention, an exhaust control system for a cylinder fuel injection engine having a cylinder injection injectors directly injecting a fuel into combustion chambers and a catalytic converter provided in an exhaust passage from the combustion chambers for purifying an exhaust gas, wherein an air/fuel ratio in the combustion chambers is periodically made rich.

According to the second aspect of the invention, an exhaust control system includes a catalytic converter temperature measuring means for measuring a temperature of the catalytic converter for making a period to making the air/fuel ratio in the combustion chambers rich (rich period) longer when a temperature of the catalytic converter is lower than a predetermined value.

According to the third aspect of the invention, an exhaust control system includes a catalytic converter temperature measuring means for measuring a temperature of the catalytic converter for reducing fuel amount to be injected into the combustion chamber for reducing degree of making the mixture rich when a temperature of the catalytic converter is lower than a predetermined value.

According to the fourth aspect of the invention, an exhaust control system includes a catalytic converter temperature measuring means for measuring a temperature of the catalytic converter for implementing combustion control for increasing CO in the exhaust gas when a temperature of the catalytic converter is lower than a predetermined value.

According to the fifth aspect of the invention, an exhaust control system for a cylinder fuel injection engine having a cylinder injection injectors directly injecting a fuel into combustion chambers and a catalytic converter provided in an exhaust passage from the combustion chambers for purifying an exhaust gas, wherein at least one time of fuel injection (auxiliary injection) is periodically performed at a timing from expansion stroke to exhaust stoke.

According to the eighth aspect of the invention, an exhaust control system includes a catalytic converter temperature measuring means for measuring a temperature of the catalytic converter for retarding timing of the auxiliary injection when the temperature of the catalytic converter is higher than the predetermined value.

According to the seventh aspect of the invention, an exhaust control system includes a catalytic converter temperature measuring means for measuring a temperature of the catalytic converter for reducing fuel amount of the auxiliary injection when the temperature of the catalytic converter is lower than the predetermined value.

According to the eighth aspect of the invention, an exhaust control system includes a catalytic converter temperature measuring means for measuring a temperature of the catalytic converter for retarding timing of the auxiliary injection when the temperature of the catalytic converter is high than the predetermined value.

According to the ninth aspect of the invention, an exhaust control system for a cylinder fuel injection engine having a cylinder injection injectors directly injecting a fuel into combustion chambers and a catalytic converter provided in an exhaust passage from the combustion chambers for purifying an exhaust gas, wherein catalytic converter temperature measuring means for measuring a temperature of the catalytic converter for periodically inhibiting ignition when the temperature of the catalytic converter is higher than the predetermined value.

By implementing the invention, the exhaust temperature is elevated (or not lowered) and combustible component (HC, CO or the like) of the exhaust gas is burned by the catalytic converter to activate the catalytic converter at early timing to reduce harmful component (HC, CO, $NO_x$ or the like) in the exhaust gas.

Namely, in the present invention according to the first to third aspects, HC and CO discharged in the rich mixture operation is purified by oxygen discharged in the lean mixture operation, and the exhaust temperature will no6t be lowered since rich mixture operation is performed. Also, even when the catalytic converter temperature is low and this the reaction amount of the catalytic converter is small, discharge of HO and CO to the atmosphere without reaction can be successfully prevented. Also, when the temperature of the catalytic converter is high and thus HO and CO react, the temperature of the catalytic converter can be further elevated. In the fourth aspect of the present invention, utilizing heat (reaction heat) generated by reaction of CO on the catalytic converter, temperature of the catalytic converter can be elevated. Sixth to eighth aspects of the invention, since complicate torque compensation by the ignition timing control is not required. By auxiliary injection, even when temperature of the exhaust gas and the catalytic converter is low and reaction amount of the catalytic converter is small, discharge of HO and CO to the atmosphere without reaction can be successfully prevented. Also, when the temperature of the catalytic converter is high and thus HO and CO react, the temperature of the catalytic converter can be further elevated. In the ninth aspect of the invention, the catalytic converter can be activated by burning HC in the catalytic converter.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 10 shows a fuel injection pattern in the third embodiment;

FIG. 13 is a diagrammatic chart showing a relationship between a catalytic converter temperature and a purification ratio;

FIG. 26 is a timing chart showing a timing of spark ignition timing in the ninth embodiment.

DESCRIPTION OF THE EMBODIMENTS

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
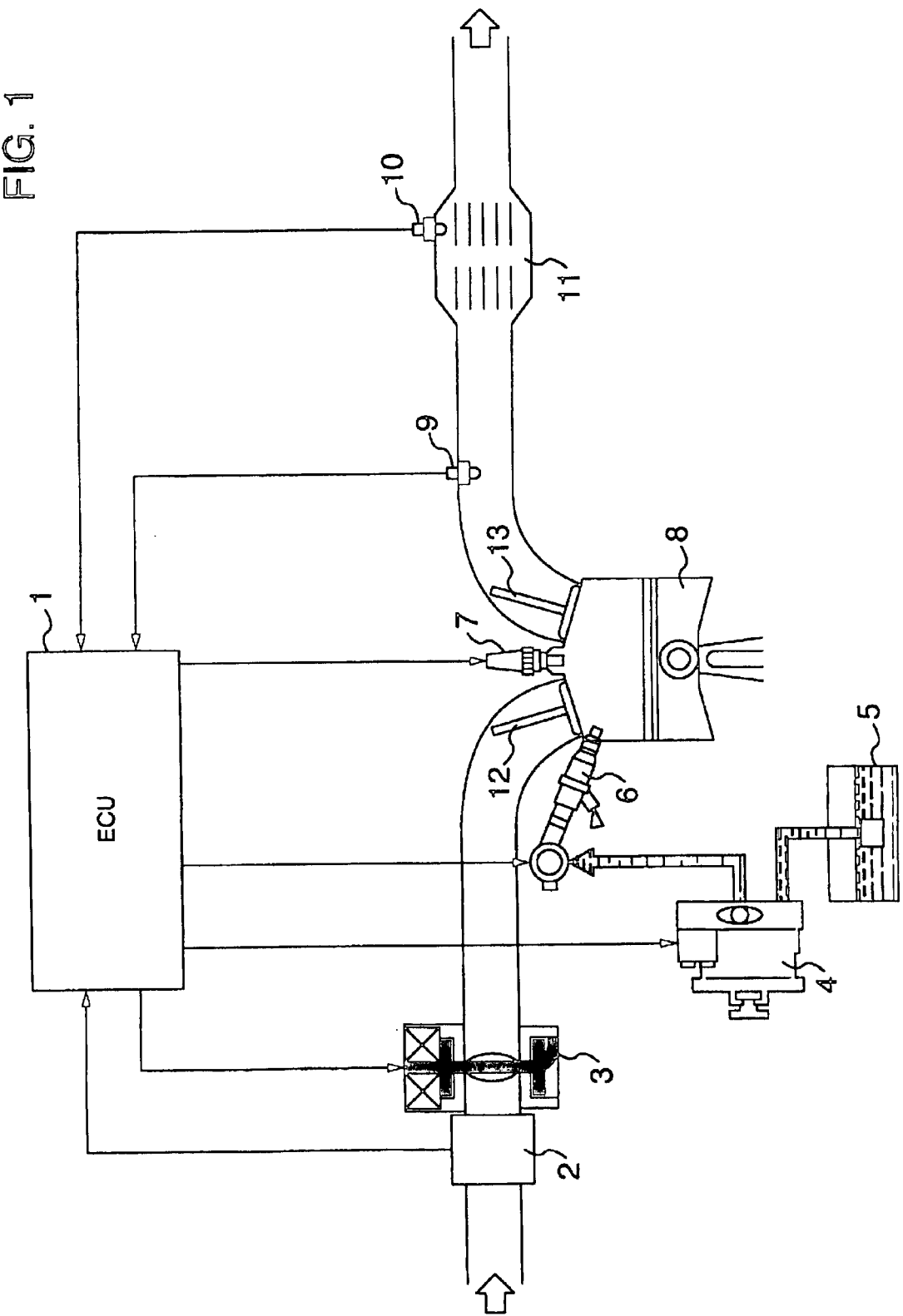
FIG. 1 is a schematic block diagram generally showing one embodiment of an exhaust control system for a cylinder fuel injection engine according to the present invention.
Figure 2:
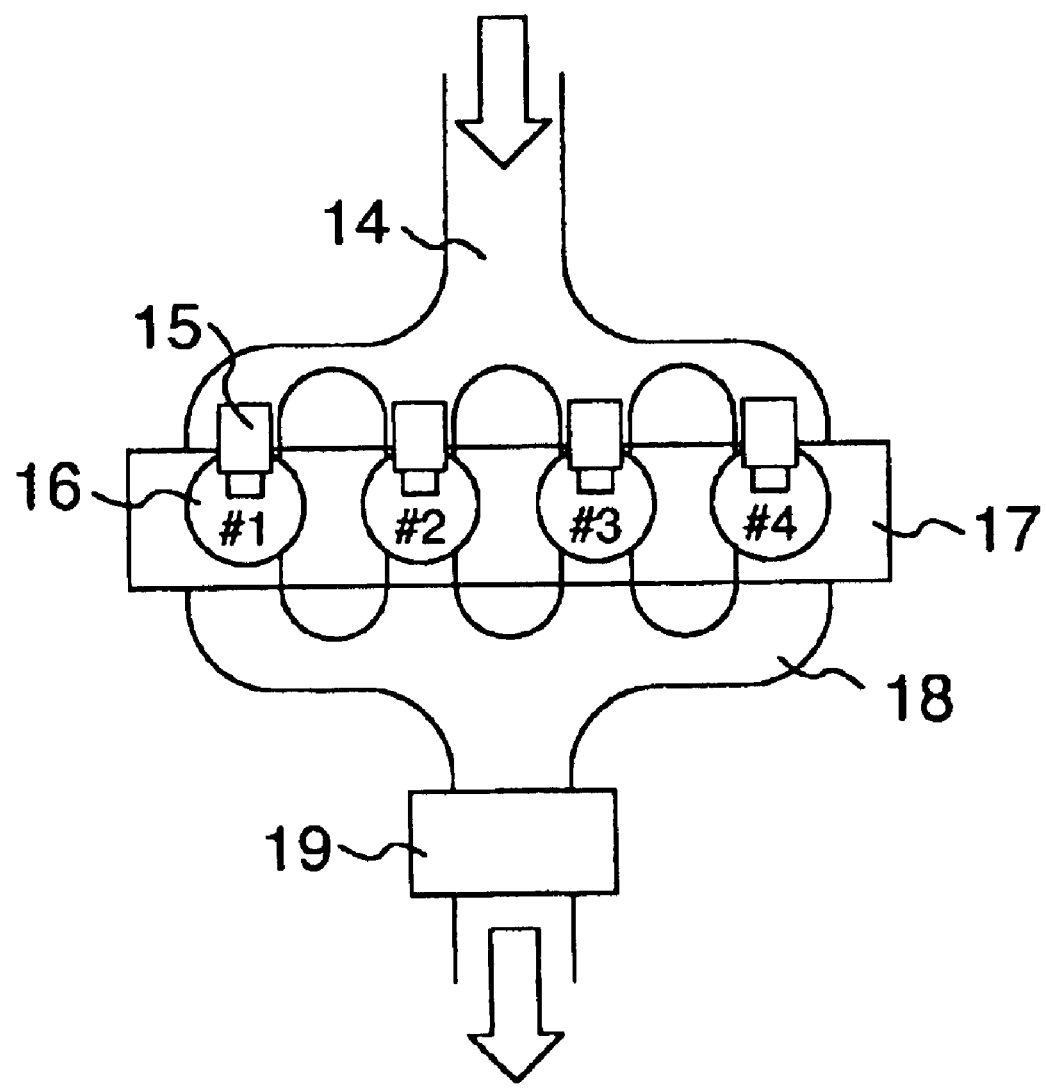
FIG. 2 is a diagrammatic illustration showing a construction of the exhaust control system for the cylinder fuel injection engine according to the present invention.

FIG. 1 is a schematic block diagram showing an exhaust control system of a cylinder fuel injection engine according to the present invention. The exhaust control system generally divided into a fuel system control unit, an air system control unit and an ignition system control unit. At first, discussion of the fuel type control unit will be given along flow of a fuel. A fuel delivered from a fuel tank 5 by a fuel pump 4 is directly injected into a combustion chamber through a valve of a cylinder injection injector 6. By the fuel system control unit, a feeding pressure of the fuel pump 4 and an injection valve of the injector 6 are controlled. Next, the air system control unit will be discussed. An air is sucked into the combustion chamber by a negative pressure generated during downward stroke of a piston 8. An amount of the air to be sucked at this time is variable depending upon throttling by an electrically controlled throttle valve 3 and timings of an intake valve 12 and an exhaust valve 13. Accordingly, in the air system control unit, an open degree of the electrically controlled throttle valve 3 and timings of the suction valve 12 and the exhaust valve 13 are controlled. Finally, the ignition system control unit will be discussed. In the ignition system, a combustible mixture of the combustion chamber is burned by spark ignition from an ignition plug 7. Accordingly, the ignition timing of the ignition plug 7 is controlled by the ignition system control unit. It should be noted that the reference numerals 1, 2, 9 10, and 11 of FIG. 1 denote an electronic control unit, an air flow meter measuring an intake air flow rate, and air/fuel ratio sensor, a catalyst temperature sensor and a catalyst portion. The following discussion will be given in terms of four cylinder engine illustrated in FIG. 2. In FIG. 2, the air introduced through the throttle valve (not shown) is distributed to the combustion chambers 16 by induction pipes 14 and is mixed with fuel injected from cylinder injector 15. Exhaust gas after combustion is discharged to the atmosphere through the catalytic converter 19 mounted in the exhaust pipe 18. In FIGS. 2, #1, #2, #3 and #4 represent combustion chamber (cylinder) number, respectively. In the embodiment, ignition is performed in order of #1, #3, #4, #2. The reference numeral 17 denotes an engine block.

Figure 3:
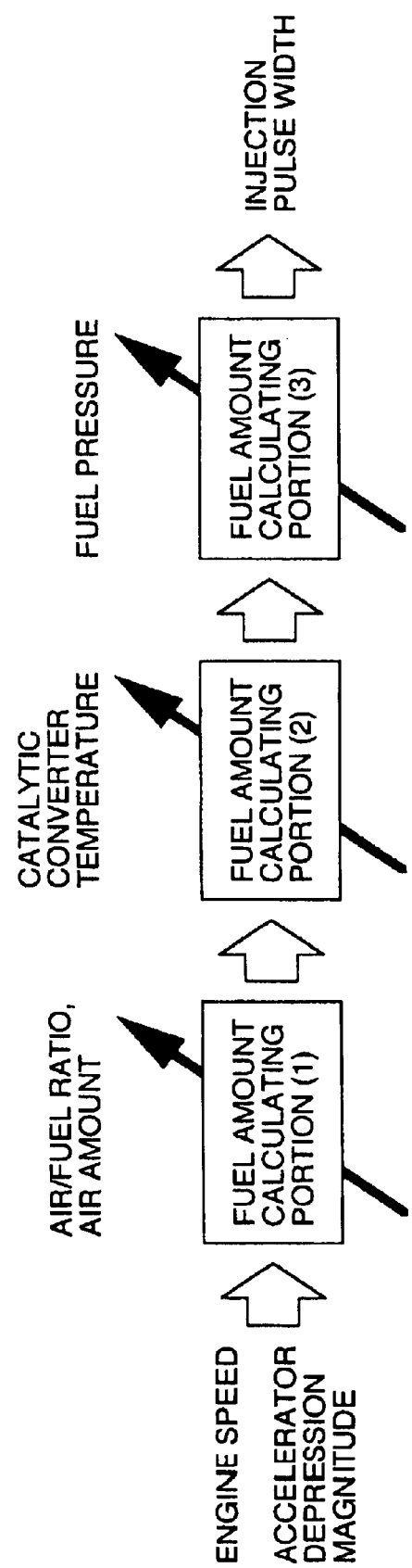
FIG. 3 is a block diagram showing a control of the first embodiment of a fuel system according to the present invention.
Figure 4:
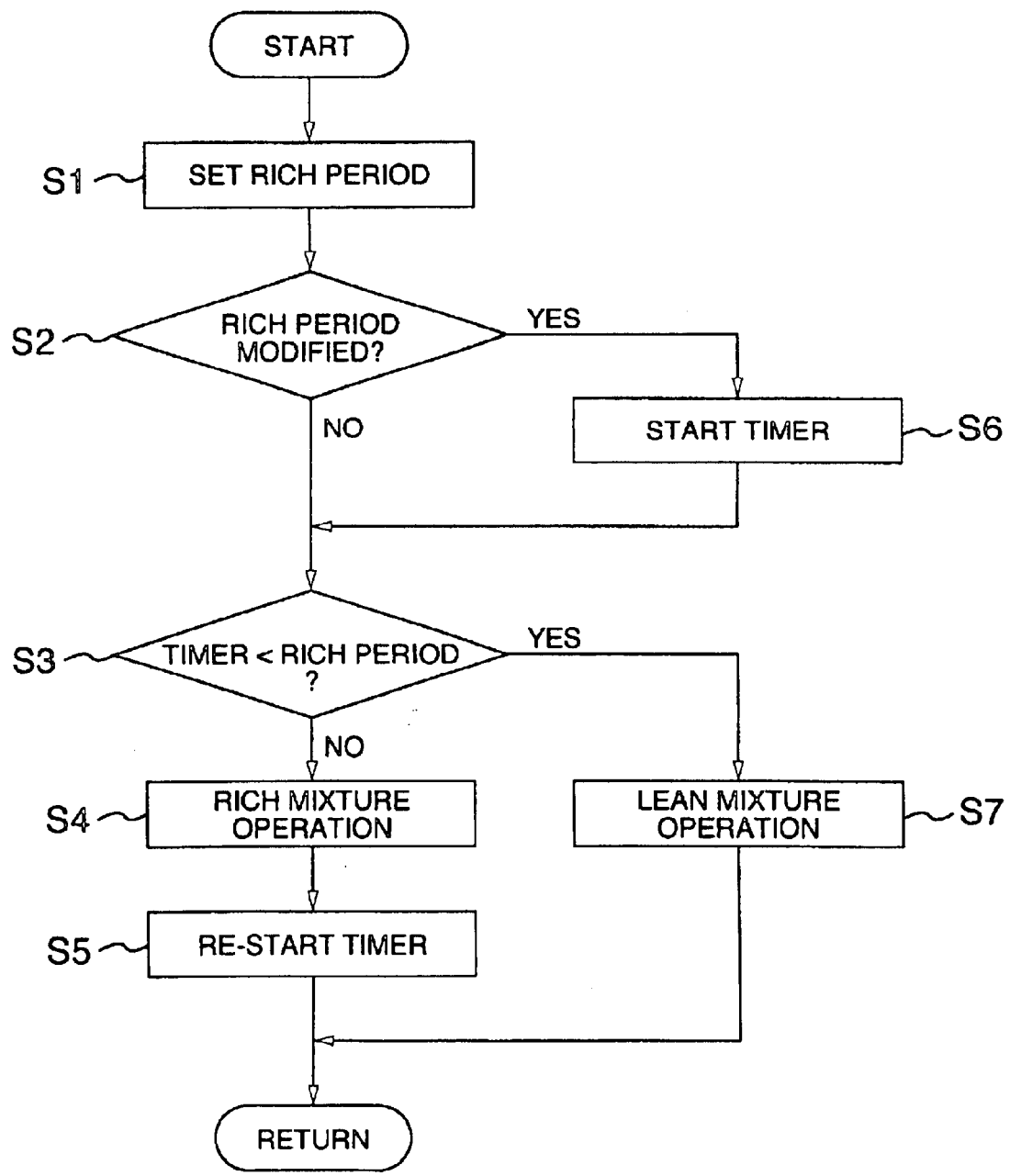
FIG. 4 is a flowchart showing the first embodiment.

The first embodiment of the present invention will be discussed with reference to a block diagram of a control system shown in FIG. 3 and a flowchart shown in FIG. 4. At first, discussion will be given for the control block diagram of FIG. 3. In a fuel amount calculating portion (1), a necessary engine torque is calculated from an engine speed and an accelerator depression magnitude and derives a fuel amount to be supplied to the combustion chamber on the basis of an air flow rate and air/fuel ratio. A fuel amount calculating portion (2) performs correction of the fuel amount on the basis of the catalyst temperature for early activation of catalyst. Finally, a fuel amount calculating portion (3) performs correction of the fuel amount on the basis of a fuel pressure for determining a fuel injection pulse width of cylinder injection injector.

Figure 5:
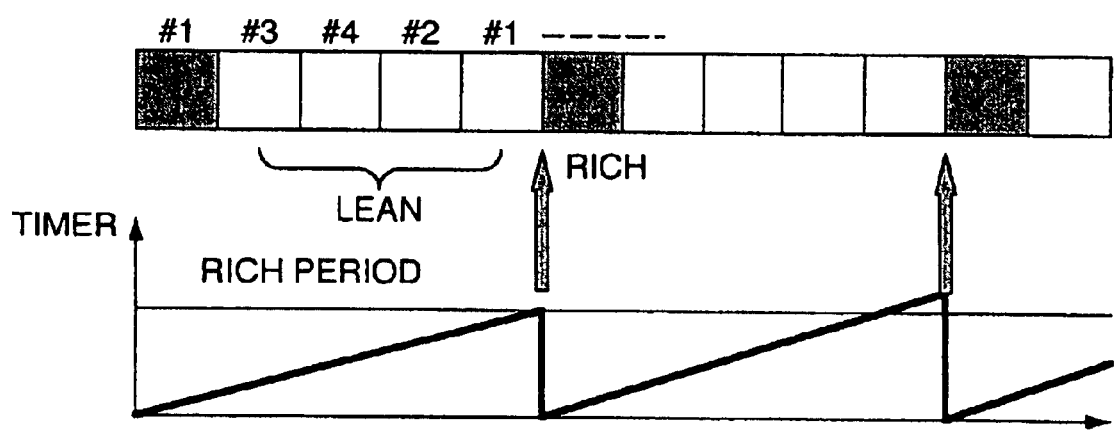
FIG. 5 shows a result of control by the first embodiment.
Figure 6A:
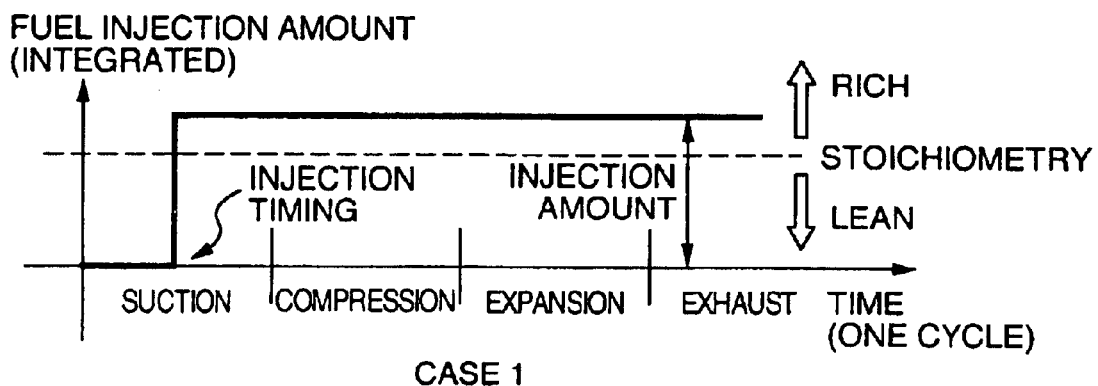
FIGS. 6A to 6C are timing charts of fuel injection amount in the first embodiment.
Figure 6B:
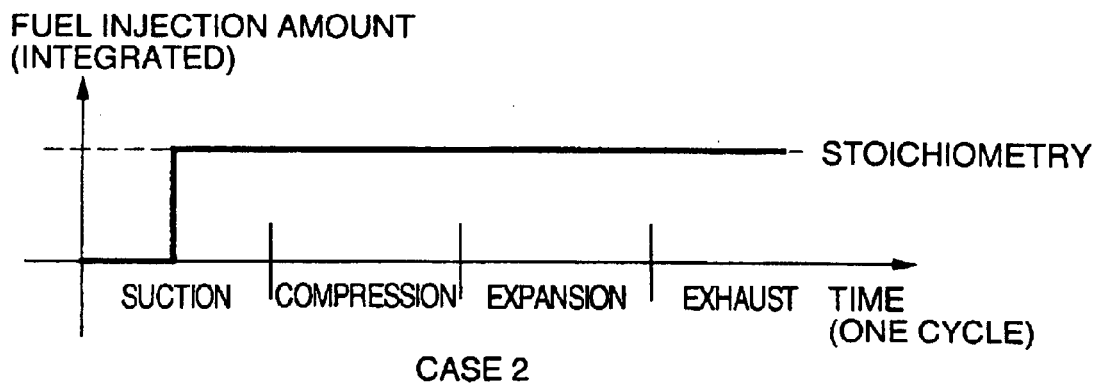
Figure 6C:
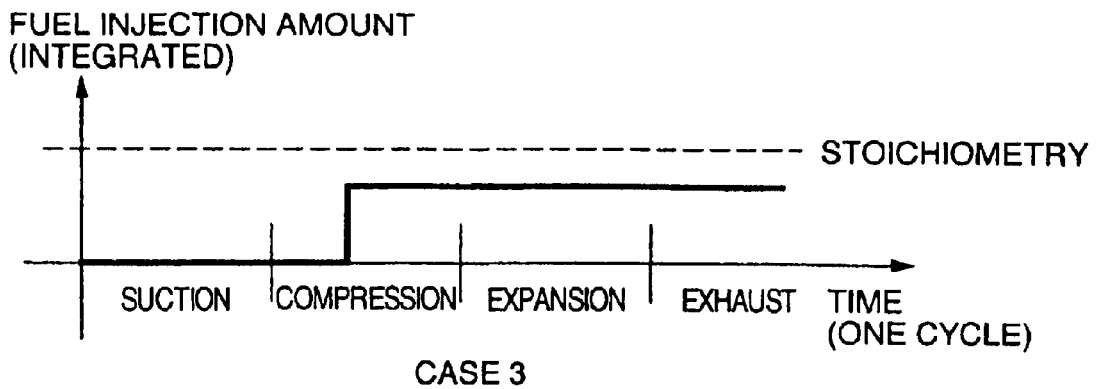

Next, a method for injection the fuel amount determined by the control block of FIG. 3 will be discussed with reference to the flowchart of FIG. 4. At first, at step S1, a rich period is set. Then, at step S2, check is performed whether modification of the rich period has been made or not. If the modification of the rich period is made, the process jumps to step S6 to start a timer. Then, at step S3, a value of the timer is checked whether the value of the timer is longer than the rich period or not. If the value of the timer is longer than or equal to the rich period, the process is advanced to step S4 to perform rich mixture operation for driving the engine with a rich mixture. Thereafter, at step S5, the timer is restarted (the value of the timer is cleared to zero). Conversely, when the value of the timer is shorter than the rich period, the process is advanced to step S7 to perform lean mixture operation for driving the engine with lean mixture. FIG. 5 shows the result of rich mixture operation and lean mixture operation according to the flowchart of FIG. 4. On the other hand, FIGS. 6A to 6C show a fuel injection timing chart (horizontal axis: time, vertical axis: an integrated value of fuel amount) in one combustion cycle of the engine cylinder. FIGS. 6A to 6C respectively show rich mixture operation (CASE 1) by injection in a suction stroke, stoichio metric mixture operation (CASE 2) by injection in the suction stroke, and lean mixture operation (CASE 3) by injection in compression stroke. In general, upon starting up of the engine, fuel injection such as that illustrated in the CASE 1 (FIG. 6A) is performed for all cylinders for certainly providing good engine start-up characteristics and combustion stability. Then, after elapse of a predetermined period or after activation of the air/fuel ratio sensor, the mode is transit to the CASE 2 (FIG. 6B), in which high purification ratio of the catalytic converter can be achieved. However, in this method, large amount of HC and CO generated associating with rich mixture operation during the CASE 1 cannot be purified for lacking of oxygen and are discharged without purification. In the shown embodiment, for solving this problem, fuel injection shown in the CASE 1 is performed in the rich mixture operation and fuel injection shown in the CASE 3 (FIG. 6C) is performed in the lean mixture operation. HC and CO to be discharged by the rich mixture operation is reacted with oxygen discharged during lean mixture operation for purification. Also, furthermore, the exhaust gas temperature in the engine cylinder operated in the rich mixture operation is higher than the exhaust has temperature in the engine cylinder operated in lean mixture operation, the exhaust gas temperature in the shown embodiment is higher than that in the case where lean mixture operation is performed in all of the engine cylinders.

Figure 7:
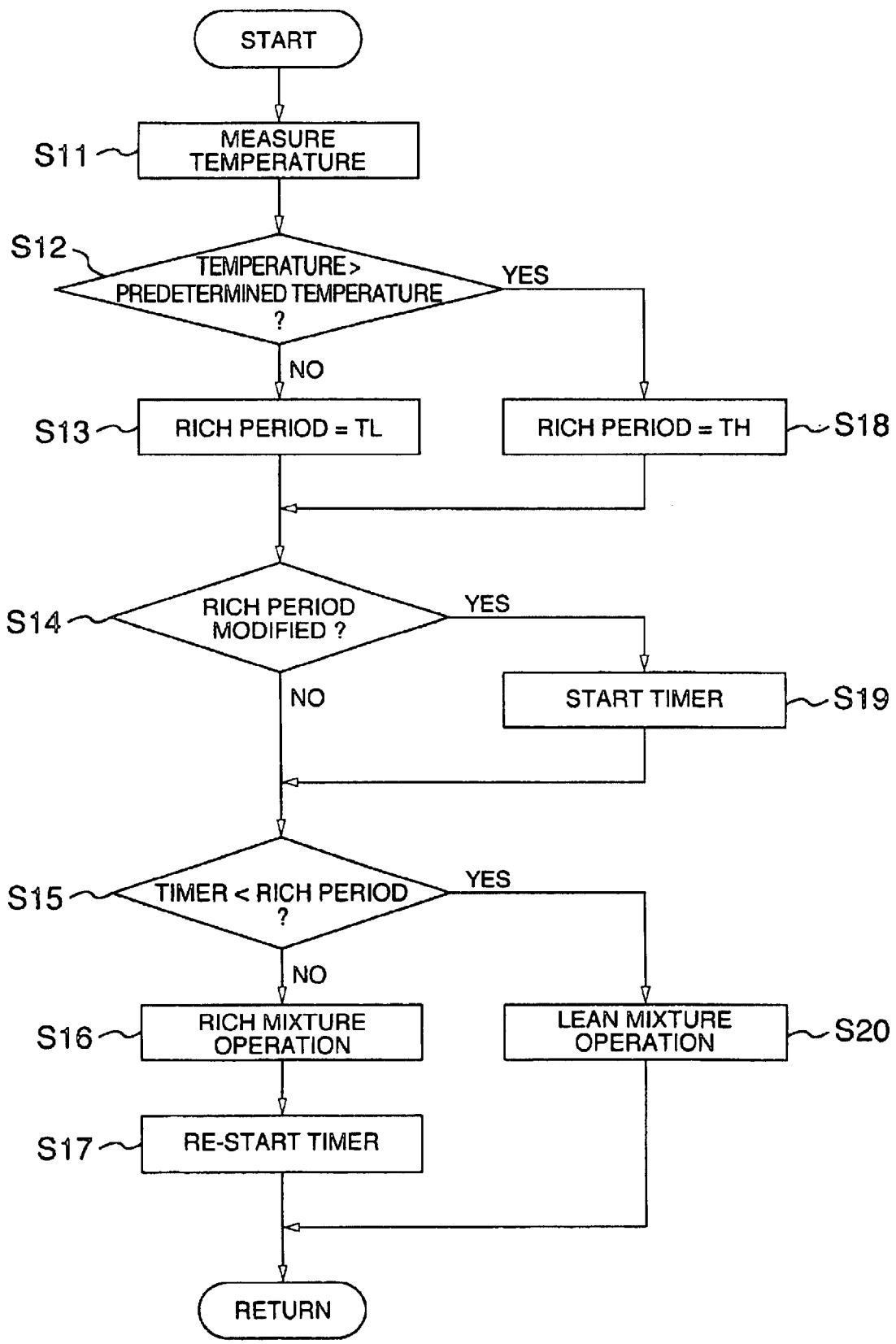
FIG. 7 is a flowchart showing the second embodiment of the present invention.
Figure 8:
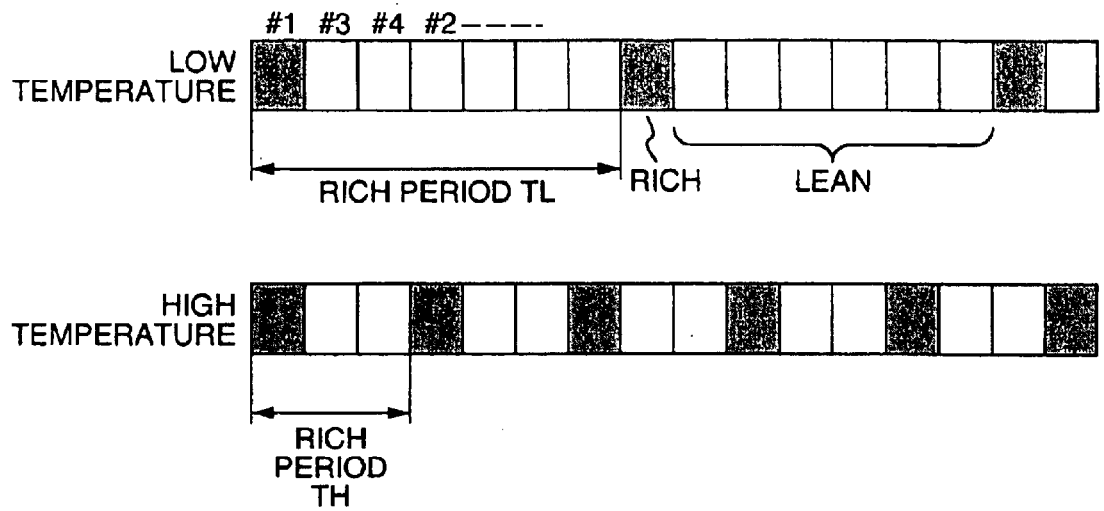
FIG. 8 shows a result of control in the second embodiment.

The second embodiment of the present invention will be discussed with reference to the flowchart in FIG. 7. At step S11, measurement of a temperature of a catalytic converter is performed. At step S12, when the temperature of the catalytic converter is higher than a predetermined temperature, the process is advanced to step S18 to set a rich period at TH. Conversely, when the temperature of the catalytic converter is lower than or equal to the predetermined temperature, the process is advanced to step S13 to set the rich period at TL (wherein TL>TH). Next, at step S14, check is performed whether the rich period is modified or not. If the rich period is modified, the process is advanced to step S19 to activate a timer. At step S15, check is performed if the value of the timer is longer than or equal to the rich period or not. If the value of the timer is longer than the rich period, the process is advanced to step S16 to perform rich mixture operation. Thereafter, at step S17, the timer is re-started (the value of the timer is cleared to zero). On the other hand, when the value of the timer as checked at step S15 is shorter than the rich period, the process is advanced to step S20 to perform lean mixture operation. FIG. 8 shows a result of rich mixture operation and lean mixture operation according to the flowchart of FIG. 7. As shown in FIG. 8, when the temperature of the catalytic converter is lower than the predetermined temperature (low temperature), a period of the cylinder to perform rich mixture operation (rich period) is set to be longer than that when the temperature of the catalytic converter is higher than the predetermined temperature (high temperature). By varying the rich period as set forth above, even when the temperature of the catalytic converter is low and thus reaction amount of the catalytic converter is small, discharge of HC or CO not purified by the catalytic converter to the atmosphere is minimized. On the other hand when the temperature of the catalytic converter is high to react with HC or CO, amount of HC or CO is increased to increase reaction amount of the catalytic converter to further elevate the temperature of the catalytic converter.

It should be noted that FIGS. 5 and 8 show examples of the same engine speed, it is preferred to adjust the rich period depending upon the engine speed. On the other hand, it is also possible to set a plurality of predetermined temperatures at step S12 of FIG. 7 for setting longer right period at lower temperature of the catalytic converter. The predetermined temperature is a temperature at which the catalytic converter starts to react with HC or CO, and is preferably set within a range of 100° C. to 250° C.

Figure 9:
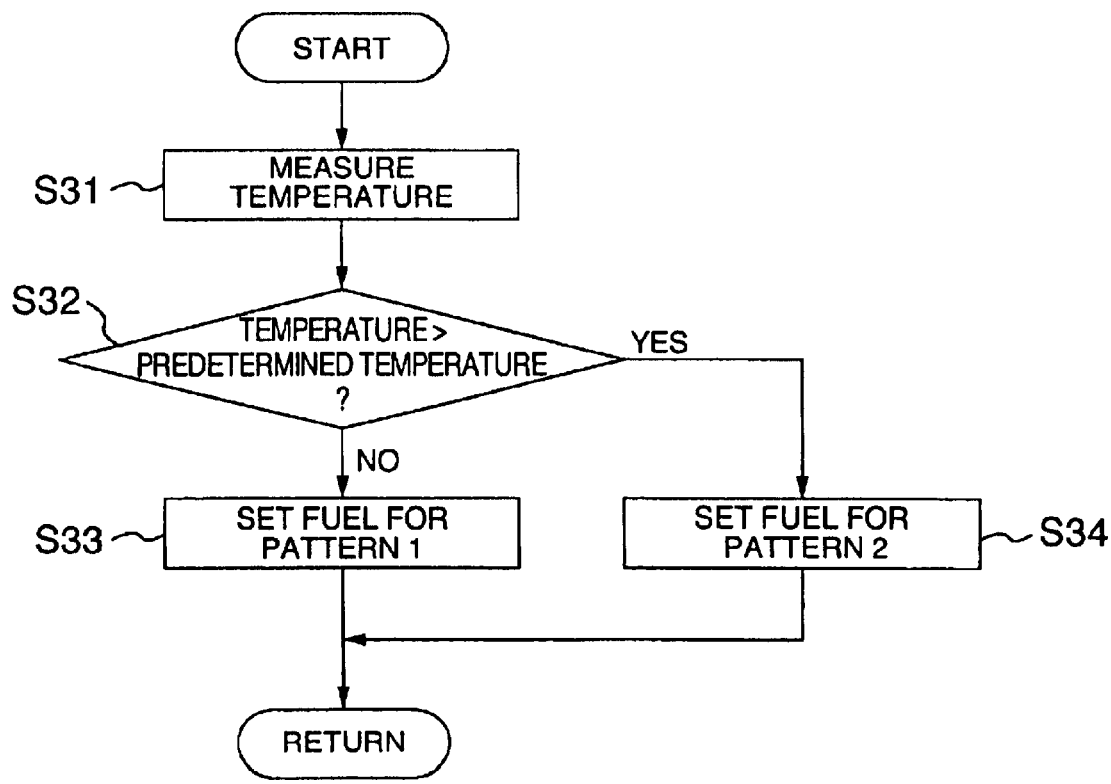
FIG. 9 is a flowchart showing the third embodiment of the present invention.
Figure 11A:
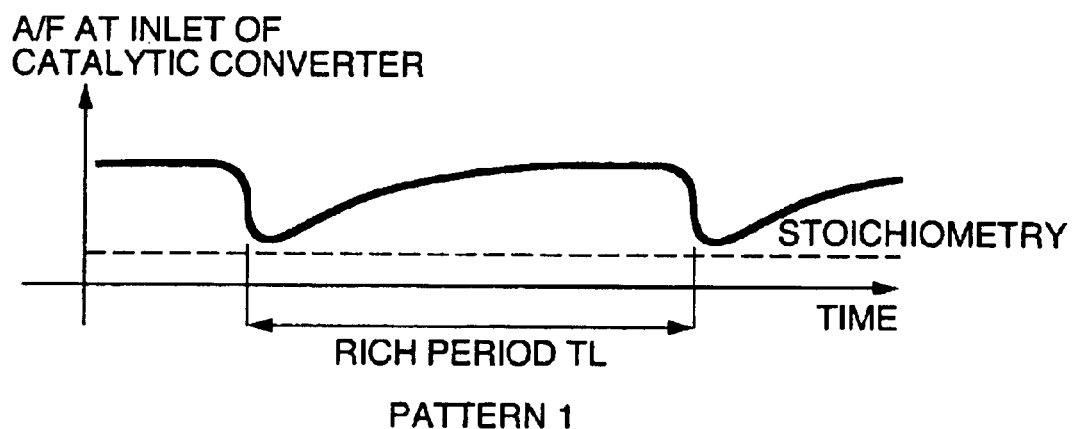
FIGS. 11A to 11C show results of control in the third embodiment.
Figure 11B:
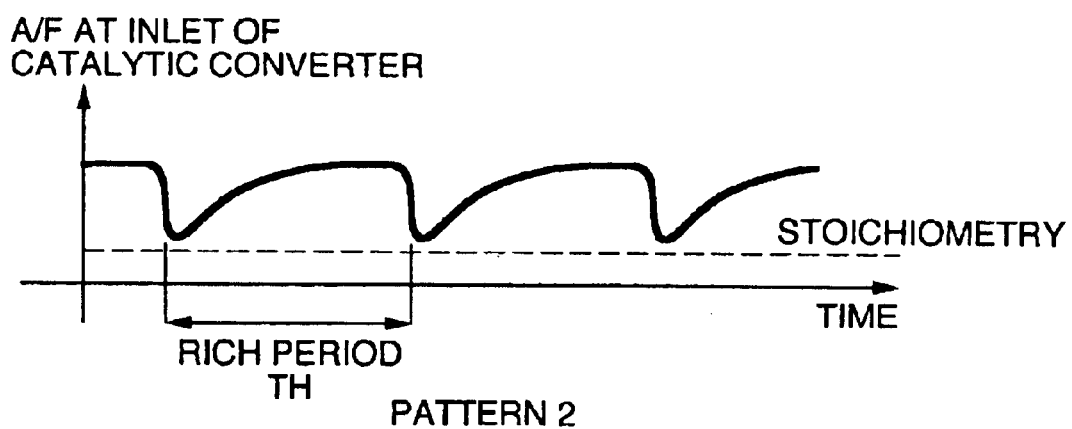
Figure 11C:
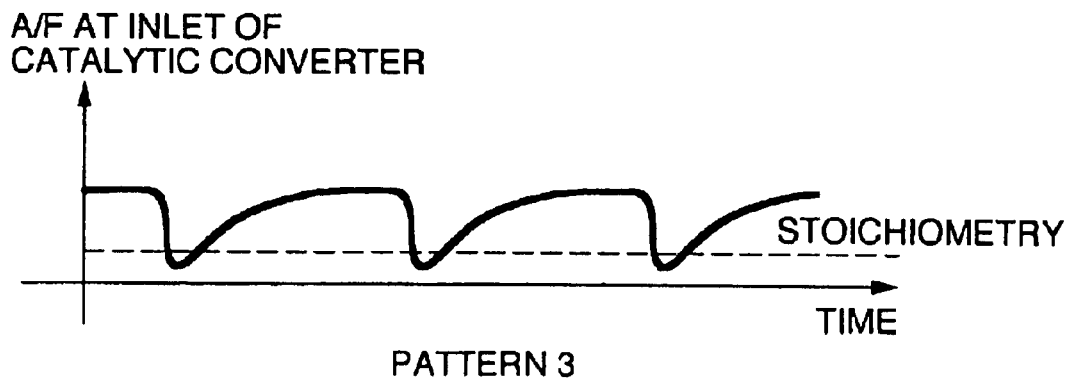
Figure 12:
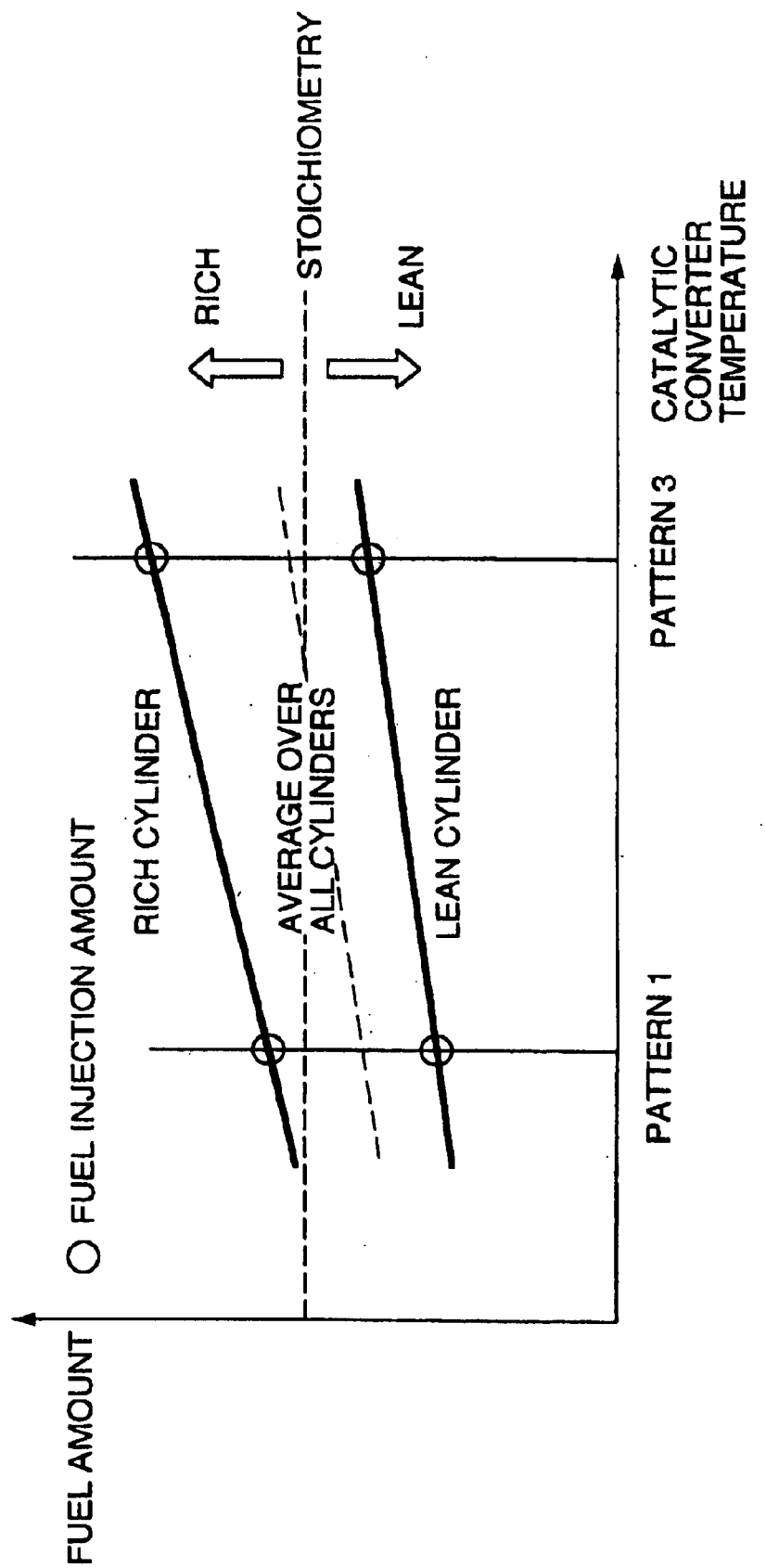
FIG. 12 shows a fuel injection pattern in the third embodiment.

The third embodiment of the present invention will be discussed with reference to the flowchart of FIG. 9. The flowchart shown in FIG. 9 illustrates a fuel correcting method depending upon the temperature of the catalytic converter in the fuel calculating portion (2) of FIG. 3. At first, at step S31, the temperature of the catalytic converter is measured. At step S32, if the temperature of the catalytic converter is higher than the predetermined temperature, the process is advanced to step S34 to set the fuel amount in a pattern 2. If the temperature of the catalytic converter is lower than or equal to the predetermined temperature, the process is advanced to step S33 to set the fuel amount in a pattern 1. FIG. 10 shows a relationship between the fuel amount in the pattern 1 and the fuel amount in the pattern 2. As shown in FIG. 10, when the temperature of the catalytic converter is lower than or equal to the predetermined temperature (pattern 1), the fuel amount to be supplied to the rich cylinder is reduced, but an average fuel amount over the overall cylinders is in a stoichometric mixture range or a lean mixture range. FIG. 12 shows an air/fuel ratio in the vicinity of an inlet of the catalytic converter in the embodiment of the present invention. As can be seen from FIG. 12, even if the rich mixture operation is performed, the air/fuel ratio at the inlet of the catalytic converter becomes lean due to the presence of the exhaust gas in lean mixture operation. Therefore, even of the temperature of the catalytic converter is lower than or equal to the predetermined temperature and the reaction amount of the catalytic converter is small, HC and CO may be reacted in the catalytic converter so as not to be discharged to the atmosphere. On the other hand, when the temperature of the catalytic converter is higher than the predetermined value, reaction amount of the catalytic converter is increased by increasing the amount of HC or CO to elevate the temperature of the catalytic converter. It should be noted that when the catalytic converter has a capability of absorbing oxygen, it is possible to temporarily increase the amount of the fuel to be supplied to the cylinder to be driven by lean mixture (lean cylinder) as shown in FIG. 12 to temporarily make the air/fuel mixture at the inlet of the catalytic converter rich as shown in pattern 3. FIGS. 11A to 11C respectively show the results of control by the patterns 1 to 3 set forth above.

Figure 14A:
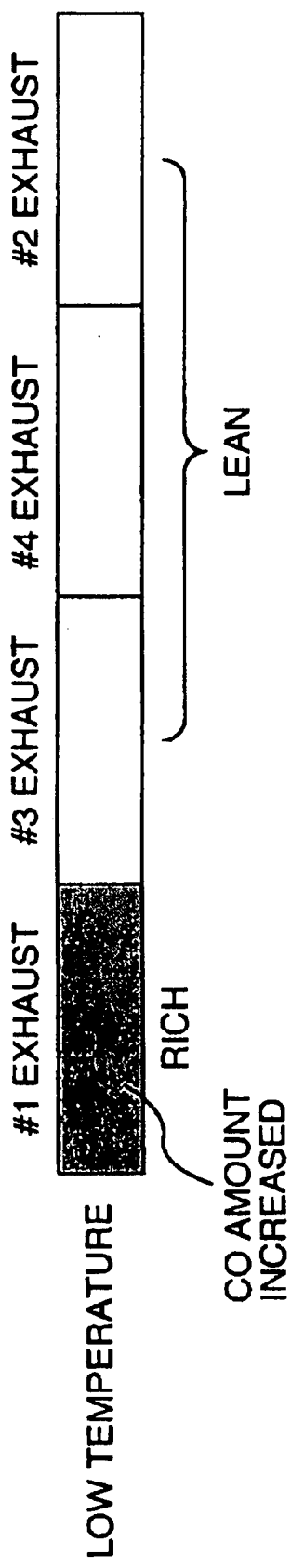
FIGS. 14A and 14B show the results of control by the fourth embodiment.

In the fourth embodiment of the present invention, EGR (exhaust gas recirculation) amount is increased when the temperature of the catalytic converter is higher than the predetermined temperature. As a method for increasing the EGR amount, a phase of the exhaust valve is retarded to cause overlap with the intake valve for increasing internal EGR, or the exhaust valve is closed at earlier timing than the normal timing. FIG. 13 shows a relationship between the temperature of the catalytic converter, CO purification rate and HC purification rate, and shows that reaction of CO starts at lower temperature than that of HC. Since reaction of CO is heating reaction, when the temperature of the catalytic converter is low, CO is increased to quickly warm of catalytic converter utilizing a heat (reaction heat) generated by reaction of CO on the catalytic converter as shown in FIG. 14A.

Figure 14B:
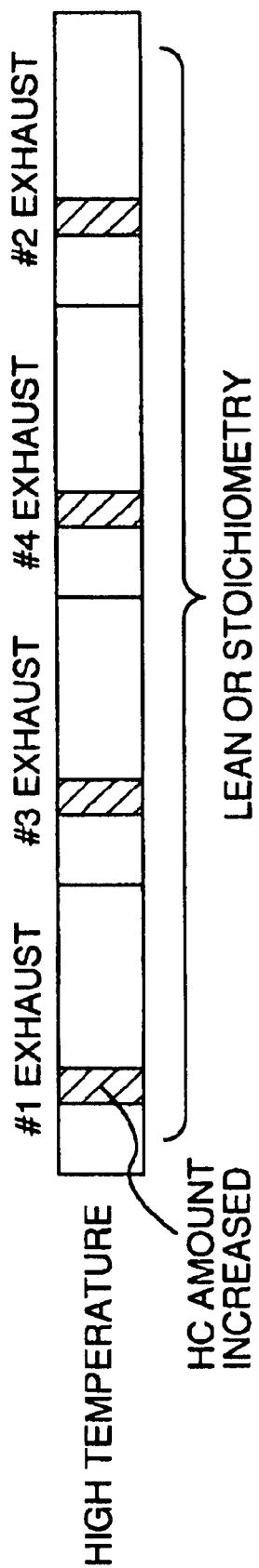

On the other hand, when the temperature of the catalytic converter is higher than the predetermined temperature, HC also cause reaction. Reaction heat of HC is higher than reaction heat of CO. Therefore, as shown in FIG. 14B, when the temperature of the catalytic converter becomes higher than the predetermined temperature, it is preferably to increase HC rather than CO. Furthermore, it is preferred to make the air/fuel ratio at the inlet of the catalytic converter lean.

Figure 15:
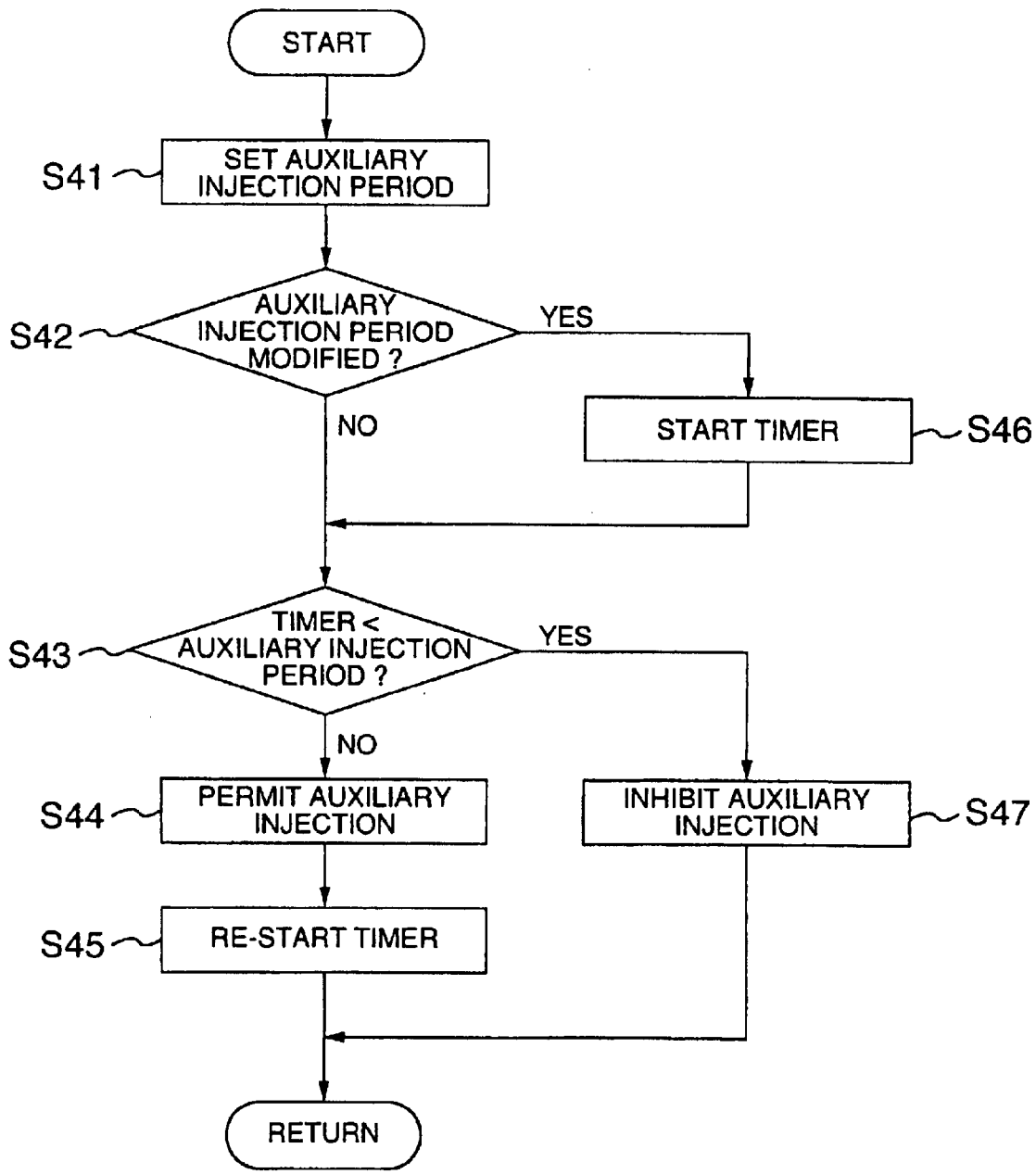
FIG. 15 is a flowchart showing the fifth embodiment of the present invention.
Figure 16:
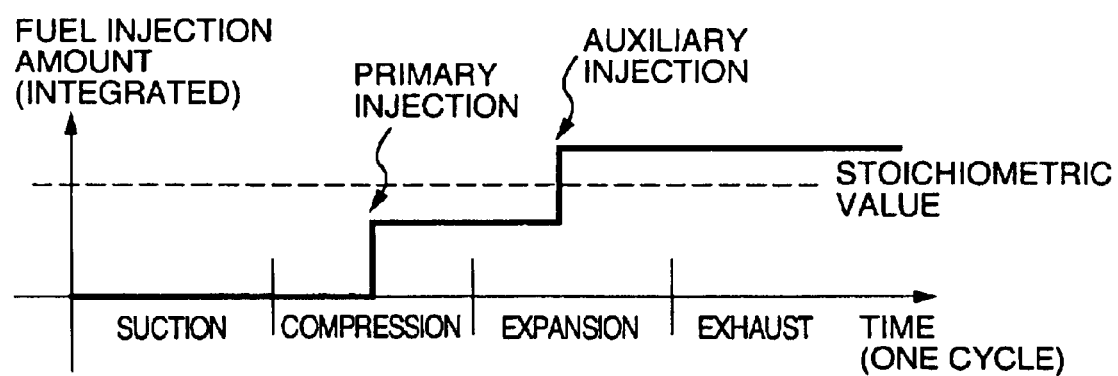
FIG. 16 is a fuel injection timing chart of auxiliary injection.
Figure 17:
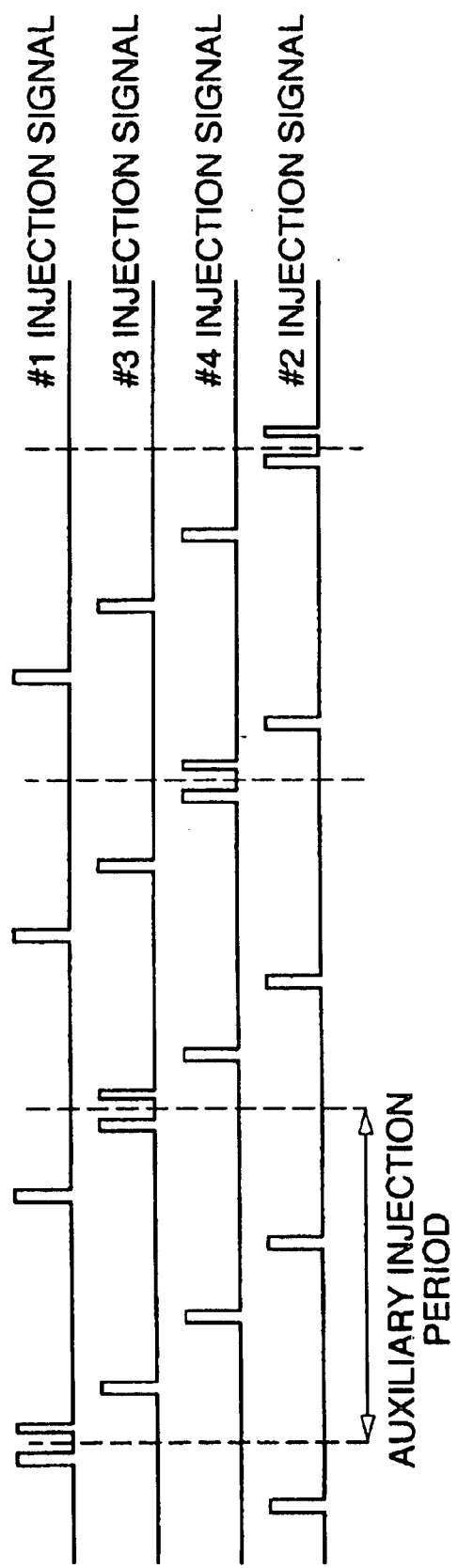
FIG. 17 is a timing chart of an injection signal in the fifth embodiment.

The fifth embodiment of the present invention will be discussed with reference to a flowchart shown in FIG. 15. At step S41, a period for performing auxiliary injection (auxiliary injection period) is set. Next, at step S42, when the auxiliary injection period is modified, the process is advanced to step S46 to start a timer. At step S43, a value of the timer and the auxiliary injection period set at step S41 are compared. When the value of the timer is smaller than the auxiliary injection period, the process is advanced to step S47 to inhibit auxiliary injection. On the other hand, when the value of the timer is greater than the auxiliary injection period as checked at step S43, the process is advanced to step S44 to permit auxiliary injection. Then, the process is advanced to step S45 to clear the value of the timer to zero. FIG. 16 shows a timing chart of fuel amount to be injected to a combustion chamber for auxiliary injection. On the other hand, FIG. 17 shows a timing chart of an injection signal of each cylinder in the case of implementing the present invention. Here, primary injection and auxiliary injection mean that the primary injection is injection to be performed for obtaining the engine torque at injection timing between suction stroke to compression stroke, and the auxiliary injection is the injection for supplying an exhaust temperature elevating or a catalyst activating agent (HC, CO and so forth) at injection timing between expansion stroke and exhaust stroke.

Figure 18:
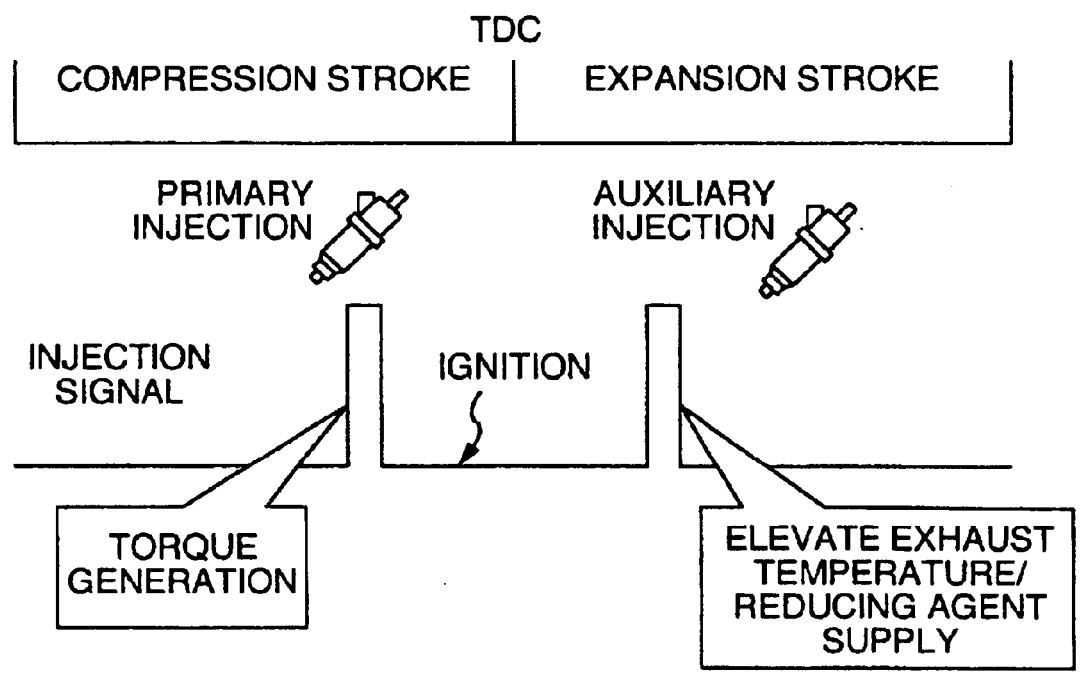
FIG. 18 is a conceptual illustration of a primary injection and an auxiliary injection.

It should be noted that, in the embodiment of FIG. 18, since there are cylinders not performing auxiliary injection, the fuel injected by the auxiliary injection can be sufficiently reacted with oxygen. Also, the rich mixture operation by the auxiliary injection has little influence for the engine torque. Therefore, complicated torque compensation by ignition timing control is not necessary.

It should be noted that, in the shown embodiment, since there are cylinders not performing auxiliary injection, the fuel injected by the auxiliary injection can be sufficiently reacted with oxygen. Also, the rich mixture operation by the auxiliary injection has little influence for the engine torque. Therefore, complicate torque compensation by ignition timing control is not necessary.

Figure 19:
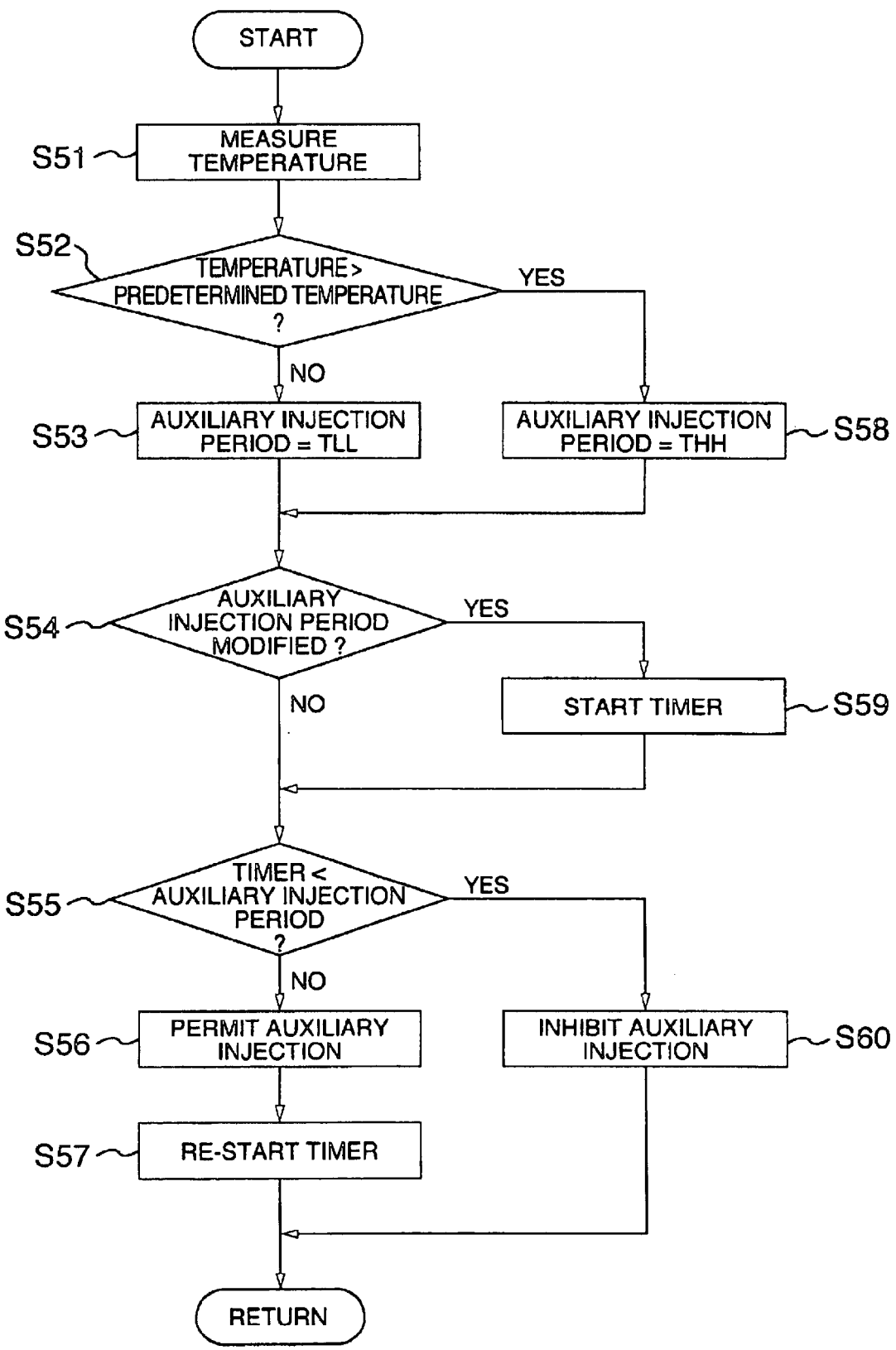
FIG. 19 is a flowchart of the sixth embodiment of the present invention.
Figure 20A:
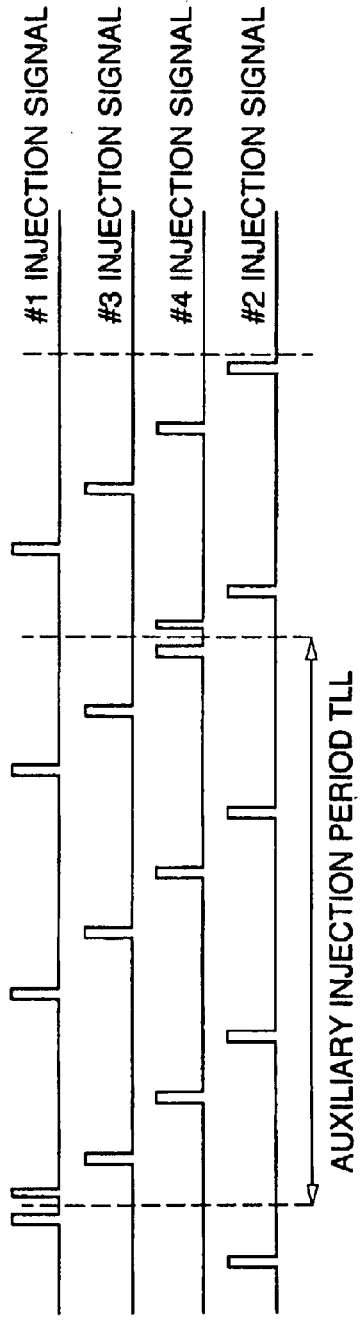
FIGS. 20A and 20B are timing charts of the injection signal in the sixth embodiment.
Figure 20B:
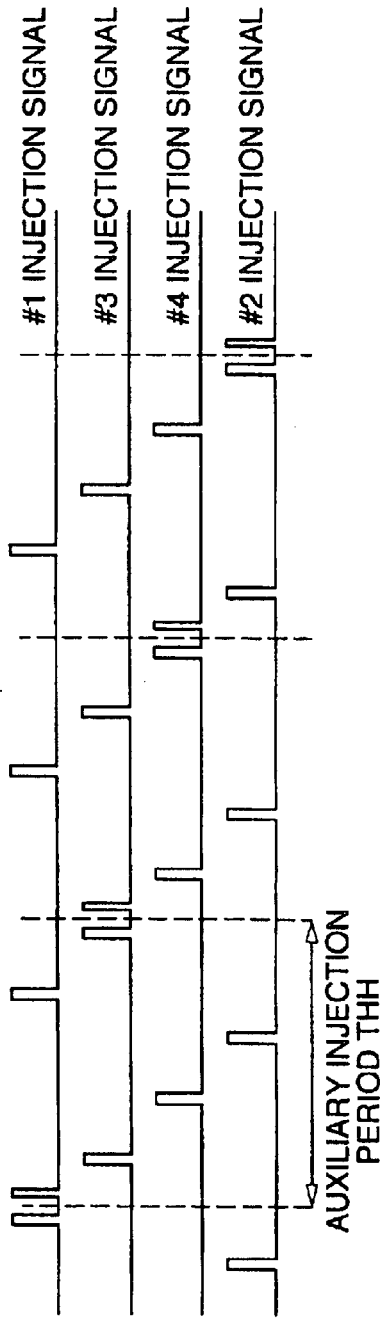

The sixth embodiment of the present invention will be discussed with reference to the flowchart shown in FIG. 19. At step S51, the temperature of the catalytic converter is measured. At step S52, when the measured temperature is higher than the predetermined temperature, the process I advanced to step S58 to set the auxiliary injection period at THH. Conversely, when the measured temperature is lower than or equal to the predetermined value, the process is advanced to step S53 to set the auxiliary injection period at TLL (wherein TLL>THH). Next, at step S54, check is performed whether the auxiliary injection period is modified or not. If modified, the process is advanced to step S59 for starting the timer. At step S55, check is performed whether the value of the timer is longer than the auxiliary injection period or not. If the value of the timer is greater than or equal to the auxiliary injection period, the process is advanced to step S57 to re-start the timer (reset the value of the timer to zero). On the other hand, at step S55, if the value of the timer is smaller than the auxiliary injection period, the process is advanced to step S60 to inhibit auxiliary injection. Otherwise, the process is advanced to step S56 to permit auxiliary injection. FIGS. 20A and 20B are timing charts of fuel injection signal in the shown embodiment.

Figure 21:
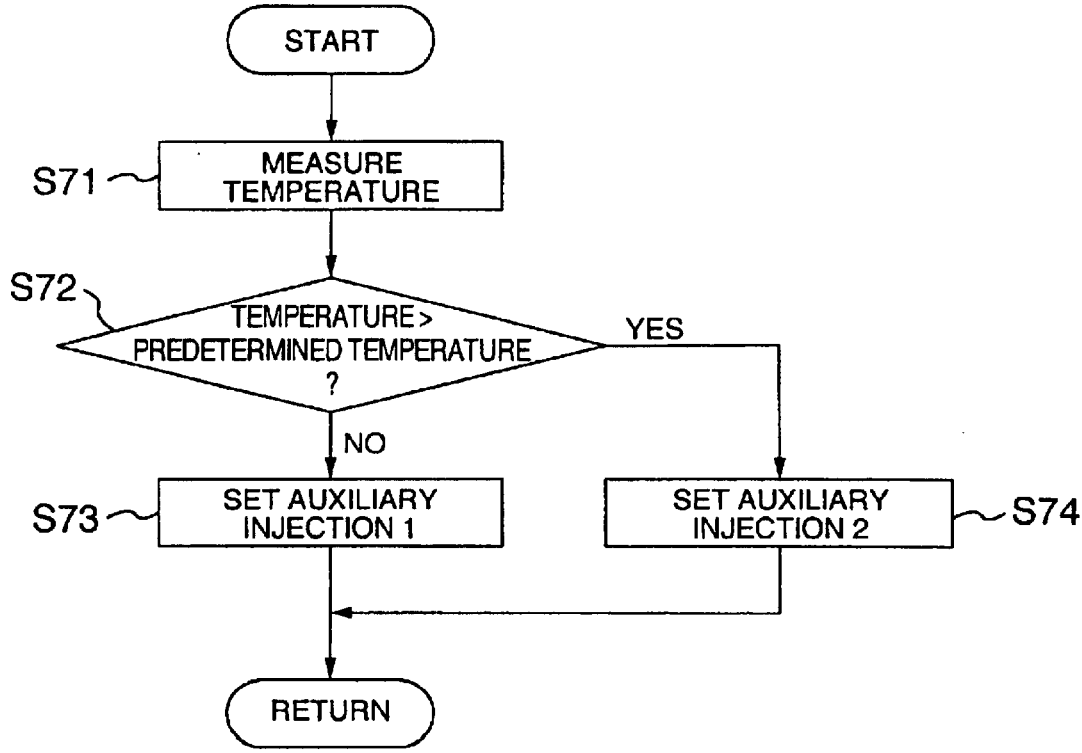
FIG. 21 is a flowchart showing the seventh embodiment of the present invention.
Figure 22A:
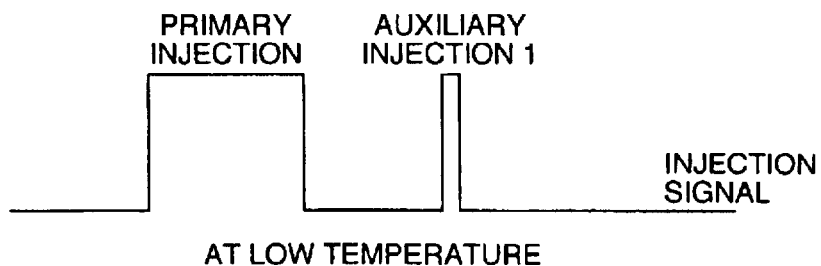
FIGS. 22A and 22B are illustrations showing an auxiliary injection pulses in the seventh embodiment.
Figure 22B:
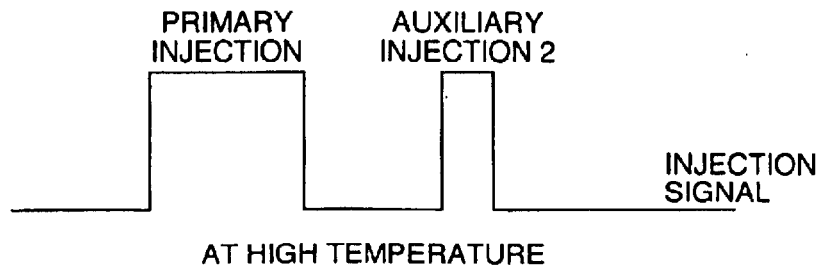

The seventh embodiment of the present invention will be discussed with reference to the flowchart of FIG. 21. At first, the temperature of the catalytic converter is measured at step S71. If the temperature of the catalytic converter is higher than the predetermined temperature as determined at step S72, the process is advanced to step S74 to set a fuel amount for auxiliary injection 2. On the other hand, if the temperature of the catalytic converter is lower than or equal to the predetermined temperature, the process is advanced to step S73 to set a fuel amount for auxiliary injection 1. As shown in FIGS. 22A and 22B, in the auxiliary injection 1 and auxiliary injection 2, injection pulse width is set to be shorter at lower temperature (FIG. 22A) than that at higher temperature (FIG. 22B).

Figure 23:
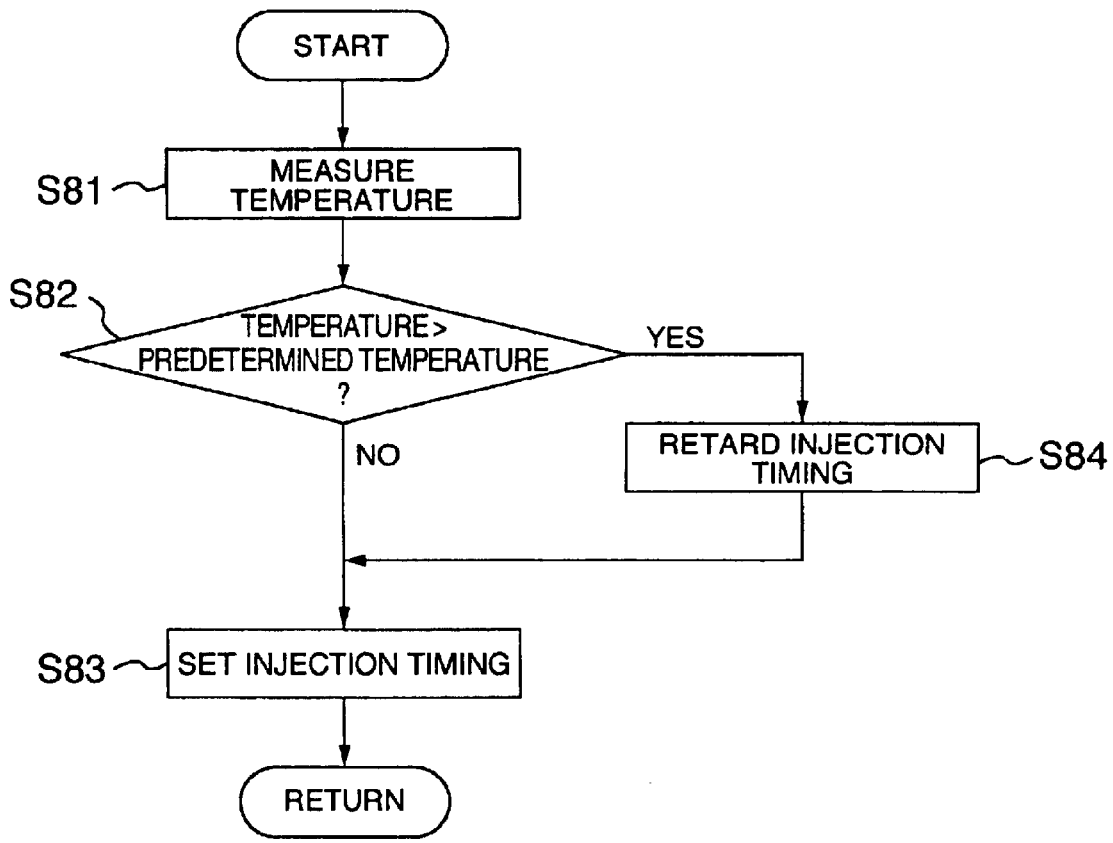
FIG. 23 is a flowchart showing the eighth embodiment of the present invention.
Figure 24:
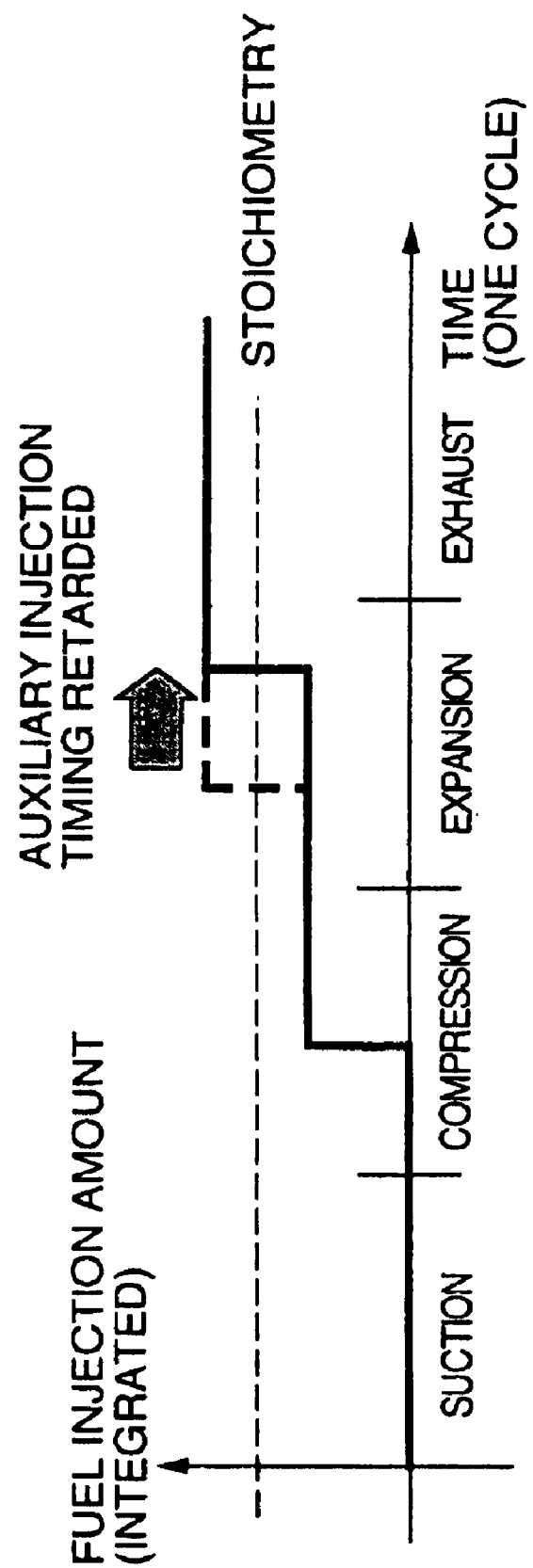
FIG. 24 is an illustration showing a fuel injection signal in the eighth embodiment.

The eighth embodiment of the present invention will be discussed with reference to the flowchart of FIG. 23. At first, the temperature of the catalytic converter is measured at step S81. If the temperature of the catalytic converter is higher than the predetermined temperature as checked at step S82, the process is advanced to step S84 for retarding the fuel injection timing of the auxiliary injection. At step S83, the retarded auxiliary injection timing is set. FIG. 24 shows a timing chart (CASE 5) of an integrated value of fuel in the combustion chamber, to which auxiliary injection of the shown embodiment is to be performed. The broken line in FIG. 24 is a timing chart of the integrated value of the fuel in the case where the temperature of the catalytic converter is lower than the predetermined value. On the other hand, the retarded injection timing is preferred to be within a range of ATDC 70° to ATDC 250°.

Figure 25:
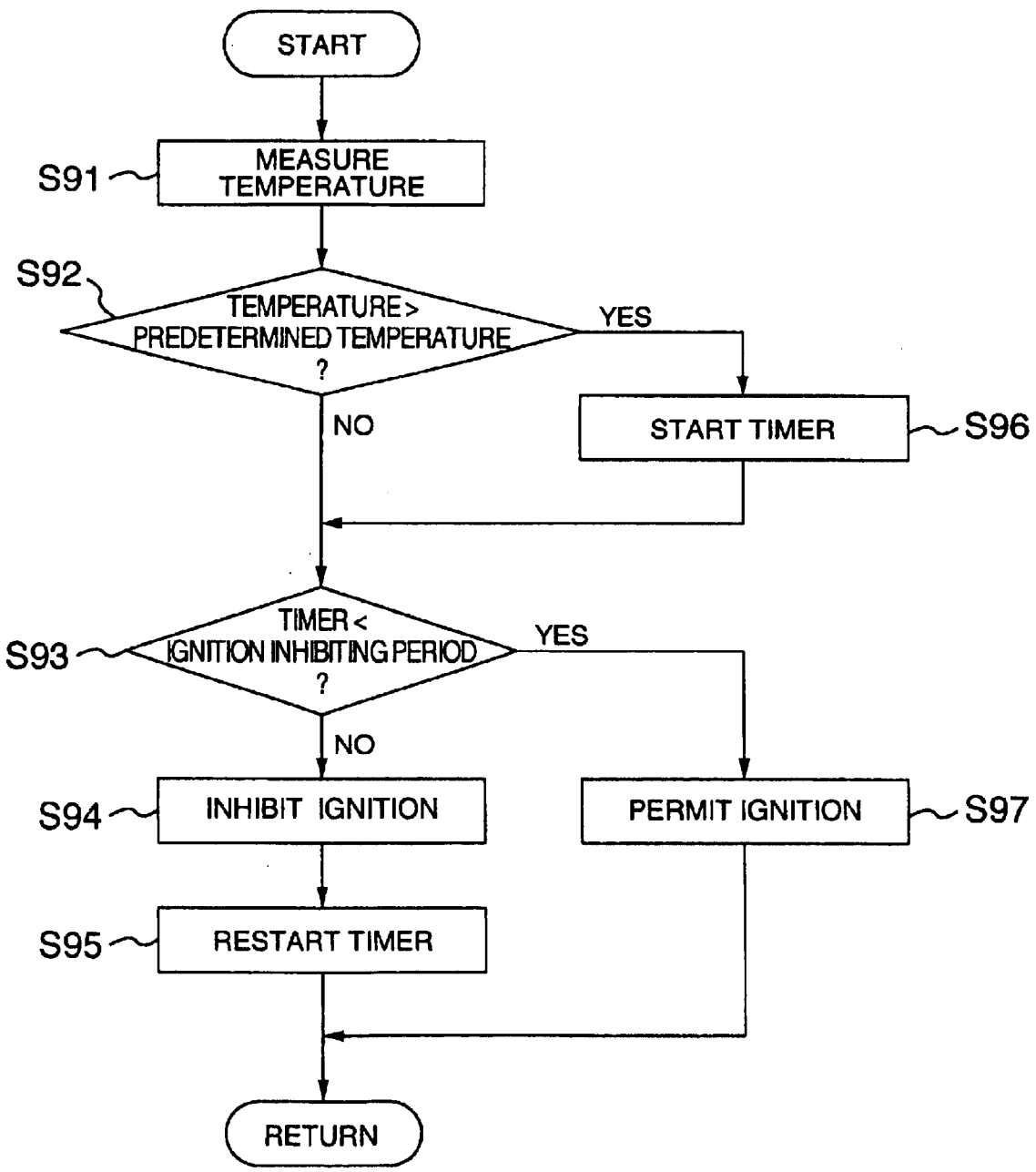
FIG. 25 is a flowchart showing the ninth embodiment of the present invention.

The ninth embodiment of the present invention will be discussed with reference to FIG. 25. At first, the temperature of the catalytic converter is measured at step S91. If the temperature of the catalytic converter is higher than the predetermined temperature as checked at step S92, the process is advanced to step S96 to start timer. At step S93, the value of the timer is compared with a period for inhibiting ignition (ignition inhibiting period). If the value of the timer is greater than or equal to the ignition inhibiting period, the process is advanced to step S94 to inhibit ignition. Then, the process is advanced to step S95 to re-set the timer to zero. On the other hand, when the temperature of the catalytic converter is lower than or equal to the predetermined temperature, the process is advanced to step S97 to permit ignition. FIG. 26 is a timing chart.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

In the embodiments set forth above, the temperature of the catalytic converter is measured by the catalytic converter temperature sensor. However, the temperature of the catalytic converter may be an estimated value. Also, while methods to perform the rich mixture operation by the fuel amount, it can also be realized by air amount control (variable valve or throttle valve control). Also, in the foregoing first to fourth embodiment of the present invention, it is also possible to set two or more sequentially injected cylinders as rich mixture operation cylinders. Also, the fuel amount to be injected to the rich mixture operation cylinder may be sequentially or periodically decreased or increased.

What is claimed is:

1. An exhaust control system for a cylinder fuel injection engine, comprising:

cylinder injection injectors for directly injecting fuel into combustion chambers;

a catalytic converter provided in an exhaust passage from said combustion chambers for purifying an exhaust gas; and a catalytic converter temperature measuring means for measuring a temperature of the catalytic converter for making an unfueled interval between two auxiliary injections longer when the temperature of the catalytic converter is lower than a predetermined value, wherein at least one time of auxiliary fuel injection is performed at a timing from expansion stroke to exhaust stroke after a primary injection in which a primary fuel is injected for obtaining an output of the engine, the primary fuel injection occurring before a timing of a spark ignition in a cylinder and the auxiliary fuel injection occurs in a cylinder in a predetermined period to increase concentration of carbon monoxide and hydrocarbon in the exhaust gas, and a cylinder having no auxiliary fuel injection is operated with lean mixture and supplied surplus oxygen to the exhaust gas.

2. An exhaust control system according to claim 1, wherein each period of the auxiliary fuel injection is constant.

3. An exhaust control system for a cylinder fuel injection engine, comprising:

cylinder injection injectors for directly injecting fuel into combustion chambers;

a catalytic converter provided in an exhaust passage from said combustion chambers for purifying an exhaust gas; and a catalytic converter temperature measuring means for measuring a temperature of said catalytic converter for reducing fuel amount of the auxiliary injection when the temperature of the catalytic converter is lower than a predetermined value, wherein at least one time of auxiliary fuel injection is performed at a timing from expansion stroke to exhaust stroke after a primary injection in which a primary fuel is injected for obtaining an output of the engine, the primary fuel injection occurring before a timing of a spark ignition in a cylinder and the auxiliary fuel injection occurs in a cylinder in a predetermined period to increase concentration of carbon monoxide and hydrocarbon in the exhaust gas, and a cylinder having no auxiliary fuel injection is operated with lean mixture and supplied surplus oxygen to the exhaust gas.

* * * * *